United States Patent Office 2,725,661
Patented Dec. 6, 1955

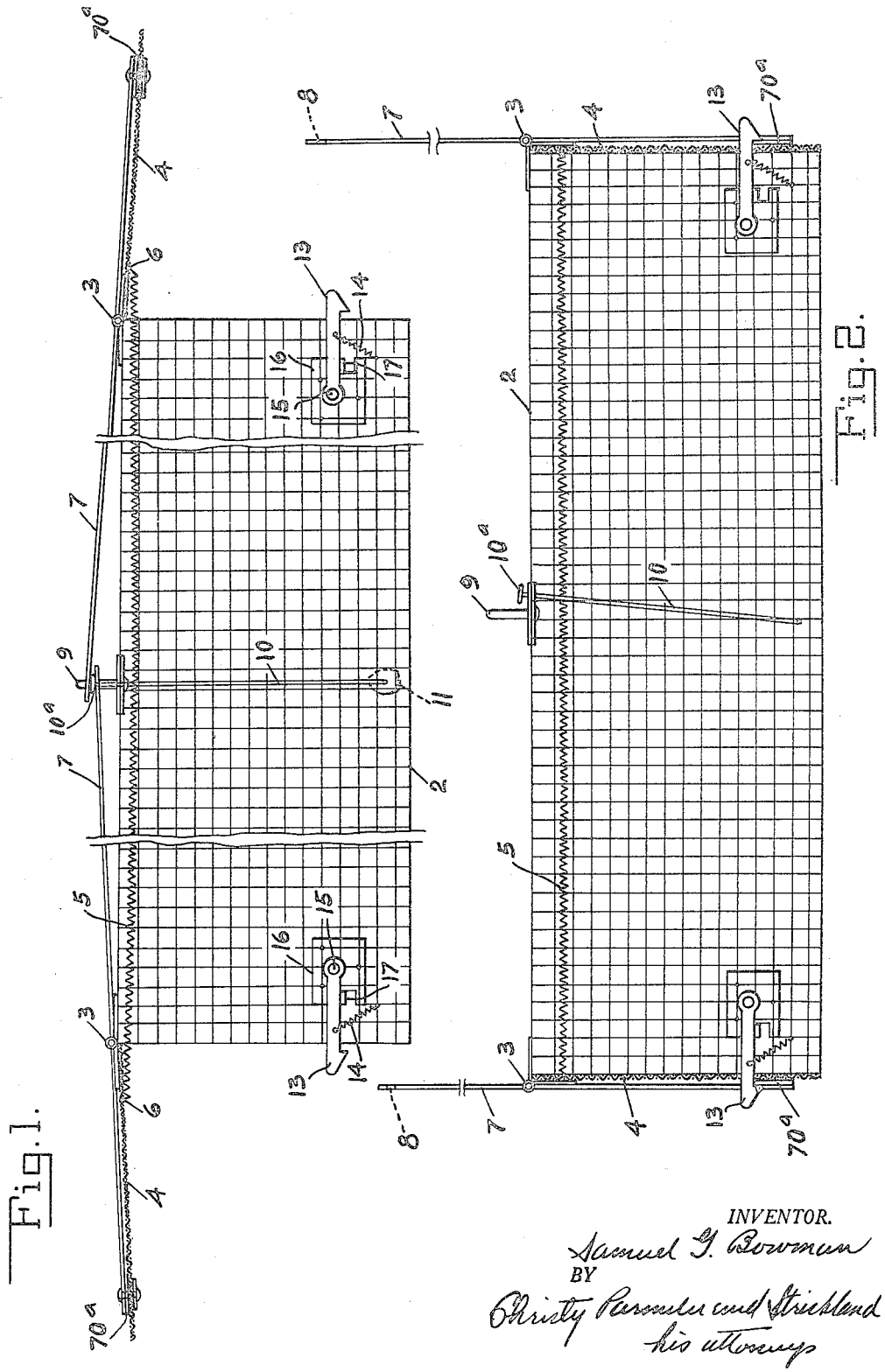

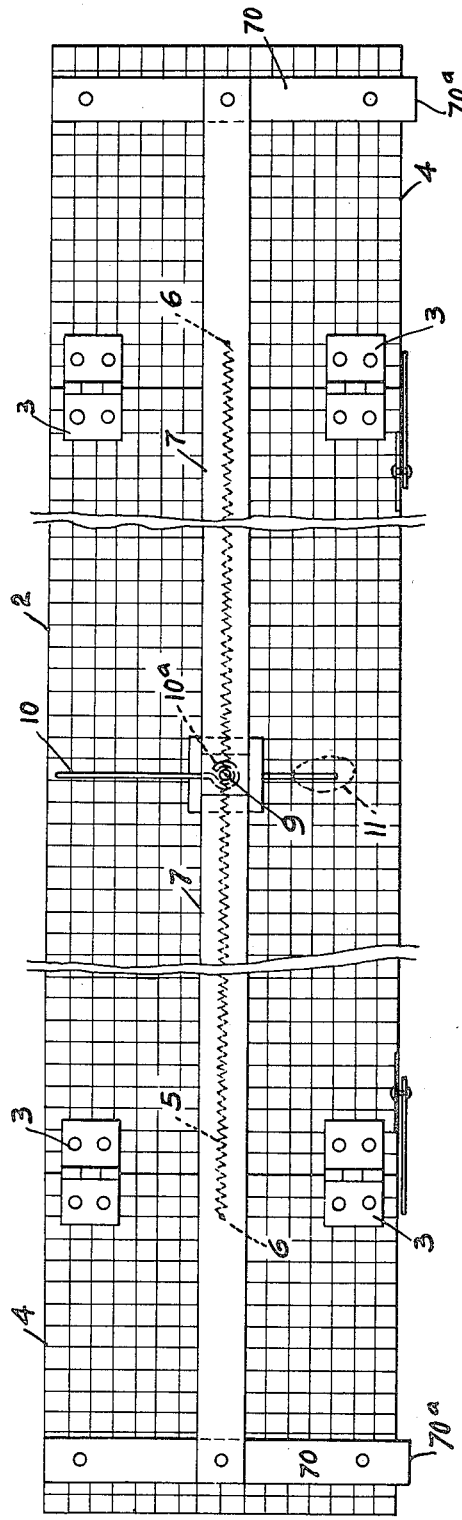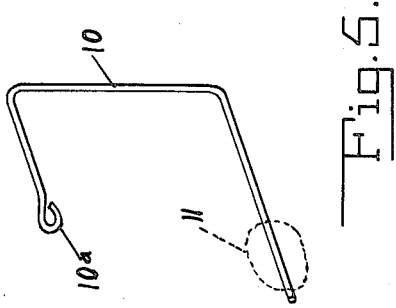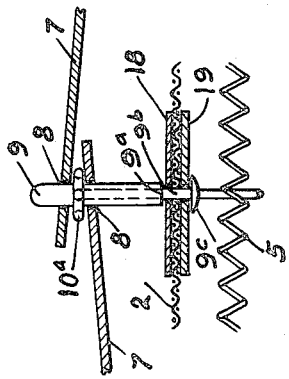

2,725,661
ANIMAL TRAP

Samuel G. Bowman, Mount Lebanon Township, Allegheny County, Pa.

Application August 20, 1953, Serial No. 375,396

3 Claims. (Cl. 43—61)

My invention relates to animal traps, particularly traps which comprise a chamber into which an animal enters and "springs" a door that encloses the animal without bodily injury.

Spring-door traps are years old, and it is to be understood that my present invention consists in certain new and useful improvements in the organization of a trigger or release mechanism that controls the release of spring-actuated trap doors. Such mechanism is inexpensive to manufacture, and is highly sensitive and positive in service. In the accompanying drawings a preferred embodiment of the invention is illustrated. In the drawings:

Fig. 1 is a view in side elevation of a two-door trap, showing the doors "set" in an open position, ready for an animal to enter, attack the bait and "spring" the doors. In this view the body of the trap and certain door-controlling arms are shown broken away at two intermediate vertical planes for purposes of illustration on a large scale;

Fig. 2 is a view similar to Fig. 1 showing the entire trap body, but with the door-controlling arms broken away; the trigger mechanism has been sprung and the trap doors closed in animal-enclosing positions;

Fig. 3 is a view of the trap in top elevation, with the parts of the trap "set," as they are in Fig. 1;

Fig. 4 is a fragmentary view, showing the trigger mechanism drawn to a larger scale and in vertical section; and Fig. 5 is a view in perspective of the trigger of the said mechanism.

The trap consists of a hollow rectangular body 2 formed of wire mesh having in this case one-half inch openings or interstices.

Hinged at 3 to each of the otherwise open-ended body 2 is a door 4 also formed of wire mesh. A helical tension spring 5 is connected to the opposite doors 4 at points 6, and this spring tends to pull the doors from the open positions, in which they are shown in Fig. 1, into the closed positions, in which they are shown in Fig. 2. Each of the doors is equipped with an extending arm 7, and when the two arms are swung into overlapped, horizontal positions, as shown in Fig. 1, the respective doors are moved into the open positions illustrated in Fig. 1.

The distal end of each arm includes a perforation 8 slightly larger than a pin 9 secured to the top of the rectangular cage or body 2 of the trap, and the arrangement is such that when the arms are overlapped at their ends, with the pin 9 projected through the perforations in the ends of the arms, the arms are secured with the doors in open position, whereby a rodent or other animal to be trapped may enter the cage 2 from either end, to reach bait which is placed in the cage.

Means are provided for springing the trap, and such means consist in a swing-trigger 10 formed in the shape of an U laid on its side, as appears in Fig. 5. At the end of the upper leg of the U an eye 10a is formed, and this eye is, when setting the trap, positioned between the overlapped ends of the arms 7 upon the pin 9. The body of the U-shaped trigger, formed inexpensively of a length of wire, extends loosely through one of the interstices of the wire body of the cage 2, and the bait is tied or otherwise secured to the lower leg of the trigger, as indicated at 11. The animal attacking the bait necessarily moves the trigger 10, and the slightest movement of the body of the trigger is effective to tilt the eye 10a and cause it to force the upper arm 7 off the pin 9. It is the frictional engagement of the upper of the two arms 7 with the pin 9 that holds the trap in "set" position. When the upper arm is released from engagement with the pin, the lower arm 7 and the eye 10a of the trigger (under the effect of the spring 5 tending to close the doors 4 and thus swing both arms 7 into vertical positions) are immediately sprung from engagement with the pin, whereupon both of the doors are rapidly swung into the closed positions illustrated in Fig. 2 and thus the animal is trapped.

The trigger 10, loosely suspended as it is, readily rises as the distal end of the lower arm 7 swings upwardly to disengage the eye 10a and itself from the pin 9. And as presently will appear the pin 9 is mounted to wobble or tilt laterally, whereby there can be no binding of the lower arm 7 or trigger eye 10a upon it, once the upper arm 7 has been sprung.

The hinges 3 and arm 7 provide structural reinforcement for the inexpensive wire-mesh body of each door 4. Further reinforcement is provided by means of a metal cross-strap 70 secured to the distal end of each door, as by welding, or soldering, or rivetting.

Means are provided for locking the doors in closed positions, and such means form positive security against the violent efforts of a trapped animal to escape. Advantageously, the locking means comprise at each end of the trap body a latch 13 pivoted, as at 15, to a plate 16 secured to the adjacent wall of the trap body (see Fig. 1). A spring 14 is secured under tension between the latch 13 and the wall of the trap body, as shown in Fig. 1, and such spring yieldingly secures the latch against a detent portion 17 on the plate 16, for cooperation with a lug portion 70a formed by the extension of the strap 70 beyond one edge of the corresponding door 4. More particularly, when the trap is sprung and the spring 5 snaps the doors closed, the lug portions 70a of the two doors are respectively engaged by the latches 13, as appears in Fig. 2, thereby positively locking the doors in closed positions, where they remain until the latches 13 are intentionally disengaged from lugs 70a, to permit the doors to be swung open for the removal of the trapped animal and/or the resetting of the trap.

A feature of the invention is found in the door-releasing trigger mechanism. The pin 9 is not a rigid thing, but is mounted for wobbler movement, whereby it instantly yields or tilts laterally when the eye 10a of the trigger is actuated to release first the upper and then the lower arm 7. This wobbler pin 9 is provided at its lower end with a stem portion 9b that extends with a loose or sloppy fit through metal disks 18 and 19 loosely positioned on the top and under surfaces, respectively, of the top wall of the trap-body. A shoulder 9a on the pin engages the top disk 18 and a rivet head 9c on the pin engages the bottom disk 19, to secure the pin to the trap body. The distance between the shoulder 9a and head 9c exceeds the aggregate thickness of the two disks 18 and 19 and the interposed top wall of the trap body, whereby the desired wobbler movement of the pin may be obtained. The pin may tilt laterally in any direction, as is required to release in instantaneous sequence the upper arm 7, the eye 10a of the trigger, and the lower arm 7.

The structure provides a very effective yet inexpensive trap of the sort indicated.

Within the terms of the appended claims, various modifications and variations in structural detail will occur to the artisan, without departing from the essence of the invention defined in the appended claims.

I claim:

1. An animal trap having a tubular body and a door hinged at each end thereof to swing between open and closed positions, a wobbler pin secured to and extending upwardly from the top of said body at a point between said doors, an arm secured to and extending from each door, tension spring means arranged to urge said doors into closed positions, each of said arms including adjacent its distal end an orifice arranged to be positioned upon said wobbler pin, with the ends of the arms overlapped and said doors in open positions, a swing-trigger having an eye portion adapted to be positioned between the overlapped ends of said arms, with the orificed end of the upper arm frictionally engaged to said wobbler pin, said swing-trigger extending from said eye portion loosely through the top wall of the trap body for the support of bait within such body, whereby when said bait is attacked the trigger swings and turns said eye portion, effecting the disengagement of said upper arm from the wobbler pin, and the consequent release of said eye portion and lower arm from the pin and the rapid closing of both of said doors.

2. An animal trap having a tubular body and a door hinged at each end thereof to swing between open and closed positions, a wobbler pin secured to and extending upwardly from the top of said body at a point between said doors, an arm secured to and extending from each door, tension spring means arranged to urge said doors into closed positions, each of said arms including adjacent its distal end an orifice arranged to be positioned upon said wobbler pin, with the ends of the arms overlapped and said doors in open positions, a swing-trigger of the general shape of an U laid on its side, an eye portion formed at the end of one leg of the U, with the base of the U extending loosely through the top wall of said trap body, and with the other leg of the U arranged substantially horizontally for the support of bait within the trap body, the eye portion of said swing-trigger being adapted to be positioned between the overlapped ends of said arms, with the orificed end of the upper arm frictionally engaged to said wobbler pin, whereby when said bait is attacked the trigger swings and turns said eye portion, effecting the disengagement of said upper arm from the wobbler pin, and the consequent release of said eye portion and lower arm from the pin and the rapid closing of both of said doors.

3. An animal trap having a tubular body and a door hinged at each end thereof to swing between open and closed positions, a wobbler pin secured to and extending upwardly from the top of said body at a point between said doors, an arm secured to and extending from each door, tension spring means arranged to urge said doors into closed positions, each of said arms including adjacent its distal end an orifice arranged to be positioned upon said wobbler pin, with the ends of the arms overlapped and said doors in open positions, a swing-trigger of the general shape of an U laid on its side, an eye portion formed at the end of one leg of the U, with the base of the U extending loosely through the top wall of said trap body, the eye portion of said swing-trigger being adapted to be positioned between the overlapped ends of said arms, with the orificed end of the upper arm frictionally engaged to said wobbler pin, whereby when said bait is attacked the trigger swings and turns the eye portion, effecting the disengagement of said upper arm from the wobbler pin, and the consequent release of said eye portion and lower arm from the pin and the rapid closing of both of said doors, together with a lug on each door, and two latches mounted on the trap body severally to engage said lugs and lock the doors as they snap into closed positions.

References Cited in the file of this patent

UNITED STATES PATENTS

| 153,722 | Pangle | Aug. 4, 1874 |
| 1,305,054 | Blevins | May 27, 1919 |
| 1,444,934 | Miller | Feb. 13, 1923 |

FOREIGN PATENTS

| 9,715 | Great Britain | 1892 |